June 10, 1930. E. G. OAKLEY 1,762,734
WASTE FITTING FOR SINKS OR THE LIKE
Original Filed Nov. 8, 1926

Inventor
Erastus G. Oakley
By Rockwell & Bartholow
Attorney

Patented June 10, 1930

1,762,734

UNITED STATES PATENT OFFICE

ERASTUS G. OAKLEY, OF SOUTHPORT, CONNECTICUT, ASSIGNOR TO BRIDGEPORT BRASS COMPANY, OF BRIDGEPORT, CONNECTICUT

WASTE FITTING FOR SINKS OR THE LIKE

Original application filed November 8, 1926, Serial No. 147,045. Divided and this application filed April 11, 1927. Serial No. 182,932.

This invention relates to a drain or waste fitting for sinks and is a division of my copending application for waste fittings or the like, filed November 8, 1926, and bearing the Serial Number 147,045. While in some respects this invention is especially adapted for use in connection with kitchen sinks, it will be understood that the invention is also adapted to be used in waste fittings for lavatories, bath tubs, or in fact, drain fittings of any kind.

In some waste fittings in use at the present time a single seat is provided for the strainer and the stopper on which either one of them is seated as the occasion may demand. This arrangement requires the withdrawal of the strainer every time the stopper is to be used. As one of the primary objects of my invention I contemplate a waste fitting in which the strainer is mounted on an independent seat, below the stopper, so that the latter may be put in place without removal of the strainer.

As another object of my invention I contemplate a waste fitting in which a simple but adequate means is provided for supporting the strainer therein.

A further object of my invention is to provide a means for supporting a strainer in a waste fitting wherein it may be readily withdrawn when occasion requires.

To these and other ends the invention consists in the novel features and combinations of parts to be hereinafter described and claimed.

In the accompanying drawings.

Figure 1:
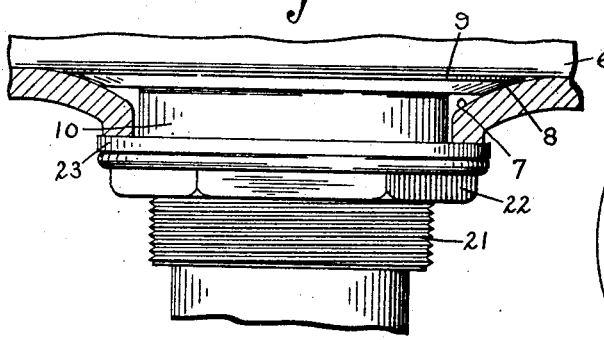
Fig. 1 is a sectional view of a sink or the like, provided with a waste fitting embodying my invention, showing the application of the fitting to the sink.
Figure 2:
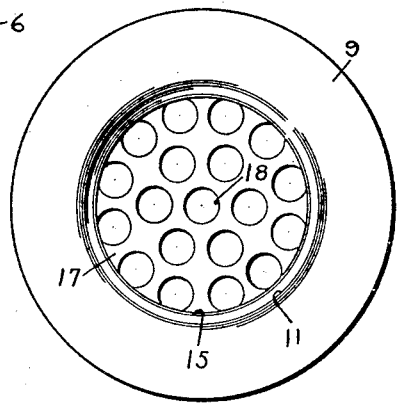
Fig. 2 is a plan view of the fitting showing the strainer inserted in place.

To illustrate a preferred embodiment of my invention I have shown a portion of the body of a sink at 6, having an opening 7 therethrough provided with a beveled edge which forms the seat for the beveled edge 8, provided at the under side of a laterally extending flange 9 on the plug or bushing 10 of the fitting. While the form of the bushing 10 may be changed to some extent without departing from my invention I prefer to provide it at its upper end with a somewhat enlarged substantially cylindrical portion 11 to provide a stopper seat upon which may be seated a stopper 12 shown in Fig. 3 when it is desired to close the drain. Below the wall 11 is provided an inwardly projecting shoulder 13 at the upper edge of which the wall of the bushing is slightly undercut at 14 for a purpose to be hereinafter described. Below the shoulder 13 the inner surface 15 of the plug is slightly tapered inwardly so that the bore gradually contracts towards an annular undercut groove 16 designed to receive the peripheral edge of a strainer 17. When the strainer is inserted in place it will drop freely into the portion of the bushing surrounded by the wall 15. As this wall gradually tapers inwardly the strainer upon being pushed downwardly will begin to bind slightly as it approaches the groove 16, and upon reaching the groove 16 will snap into place within this groove so that it may be frictionally retained therein. The form of the strainer 17 is shown in Fig. 5 and by inserting an instrument through an opening 18 therein the strainer may be readily removed from the bushing when desired.

Figure 5:
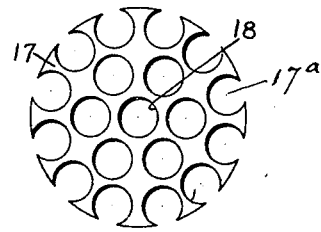
Fig. 5 is a detail view of the first mentioned strainer.

It will be seen that the groove 16 provides a shoulder in which the strainer seats and that the strainer member 17, as shown in Fig. 5, is provided with notches 17$^a$ in its periphery so that the edge of the strainer is provided with a plurality of substantially radial spring tongues lying in the same plane as the body of the strainer disk. Thus the strainer is contractible at its edge portion for insertion into the shoulder in order that it will snap into place and be retained therein, but at the same time it may be readily removed as above explained. Each of the notches 17ª is preferably in the shape of a rounded recess contracted in width at the mouth thereof, as shown. The spring tongues lie within the lines of the disk and define the edge thereof.

Figure 3:
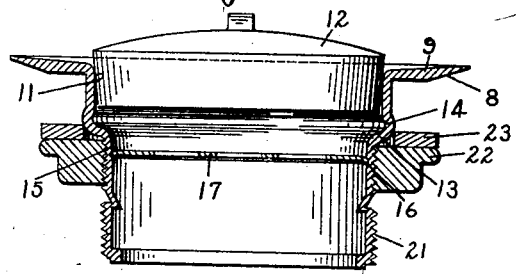
Fig. 3 is a sectional view through the fitting, showing the stopper supported on its seat.
Figure 4:
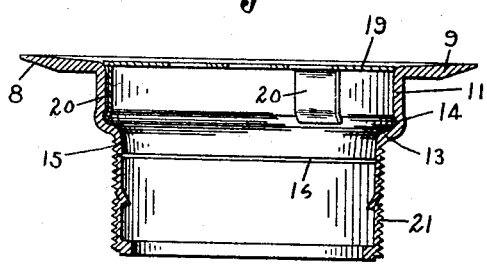
Fig. 4 is a sectional view of the fitting, showing a second strainer inserted in the top of the fitting above the lower strainer seat.

As clearly shown in Fig. 3, the strainer when seated in the groove 16 is some distance below the mouth of the bushing 10, and the stopper 12 may be inserted in the bushing without removing the strainer. In some instances, it may be desirable to use a strainer of the form shown in the patent to Clark, No. 1,224,603, shown at 19 in Fig. 4, and having depending lugs 20, the ends of which enter the undercut groove 14 below the wall 11 to hold the strainer in place. A strainer of this character may be used in connection with, or independently of the strainer 17; that is, without removing the strainer 17 from the fitting the stopper 12 or the strainer 19 may be inserted in the mouth of the bushing 10.

It will be understood that the exterior surface of the bushing may be threaded, as shown at 21, to receive the nut 22 to clamp the bushing to the sink, lavatory, bath tub or other article with which it is used. A washer 23 may be placed about the bushing above the nut 22.

While I have shown and described some preferred embodiments of my invention, it will be understood that it is not to be limited to all the details shown but is capable of modification and variation within the spirit of the invention and within the scope of the appended claims.

I claim:

1. In a sink drain and the like, a bushing having a shoulder adapted to provide a seat, and a strainer member having the peripheral portion thereof so constructed that the edge is contractible in diameter for ready insertion in the shoulder, and to be easily removable therefrom.

2. In a sink drain or the like, a bushing having a shoulder, and a strainer member so constructed that the peripheral circumference is contractible to be snapped into place in the shoulder in the bushing and to be readily removable therefrom.

3. In a sink drain or the like, an unyielding bushing having a shoulder adapted to function as a seat, and a strainer member having a plurality of spaced notches in the peripheral portion thereof whereby the edge is contractible in diameter making the strainer readily insertible in the shoulder and easily removable therefrom.

In witness whereof, I have hereunto set my hand this 4 day of April, 1927.

ERASTUS G. OAKLEY.